United States Patent [19]
Furuta

[11] Patent Number: 5,481,089
[45] Date of Patent: Jan. 2, 1996

[54] HEATER CONTROL DEVICE FOR IMAGE FORMING APPARATUS

[75] Inventor: Hideki Furuta, Saitama, Japan

[73] Assignee: Fuji Xerox Co., Ltd., Tokyo, Japan

[21] Appl. No.: 902,743

[22] Filed: Jun. 23, 1992

[30] Foreign Application Priority Data

Jun. 24, 1991 [JP] Japan .................................. 3-151551

[51] Int. Cl.⁶ .................................................. H05B 1/02
[52] U.S. Cl. ...................... 219/497; 219/492; 219/216; 219/508; 323/235; 323/901
[58] Field of Search ..................... 219/216, 494, 219/492, 497, 501, 505, 481, 508; 323/319, 235, 236, 901

[56] References Cited

U.S. PATENT DOCUMENTS

| | | | |
|---|---|---|---|
| 4,188,528 | 2/1980 | Wierzchowski et al. | 219/492 |
| 4,506,144 | 3/1985 | Hesford et al. | 219/497 |
| 4,603,245 | 7/1986 | Yagasaki | 219/216 |
| 4,740,671 | 4/1988 | Kuroda et al. | 219/492 |
| 4,935,606 | 6/1990 | Geary | 219/501 |

FOREIGN PATENT DOCUMENTS 3-75805  3/1991  Japan .

*Primary Examiner*—Mark H. Paschall
*Attorney, Agent, or Firm*—Finnegan, Henderson, Farabow, Garrett & Dunner

[57] ABSTRACT

Disclosed is a heater control device which controls a heater used in an image forming apparatus such as a laser printer, a copying machine, or a facsimile machine. The heater control device includes a switch for connecting and disconnecting an application of an alternating current voltage to the heater used in the image forming apparatus, and a switch control unit for varying a period of time for the application of the alternating current voltage to the heater per unit period of time by controlling the switch in accordance with a value of the alternating current voltage applied to the heater. The heater control device can be used regardless of the differing voltage levels of available commercial power provided in various geographic regions of the world respect to voltage.

3 Claims, 9 Drawing Sheets

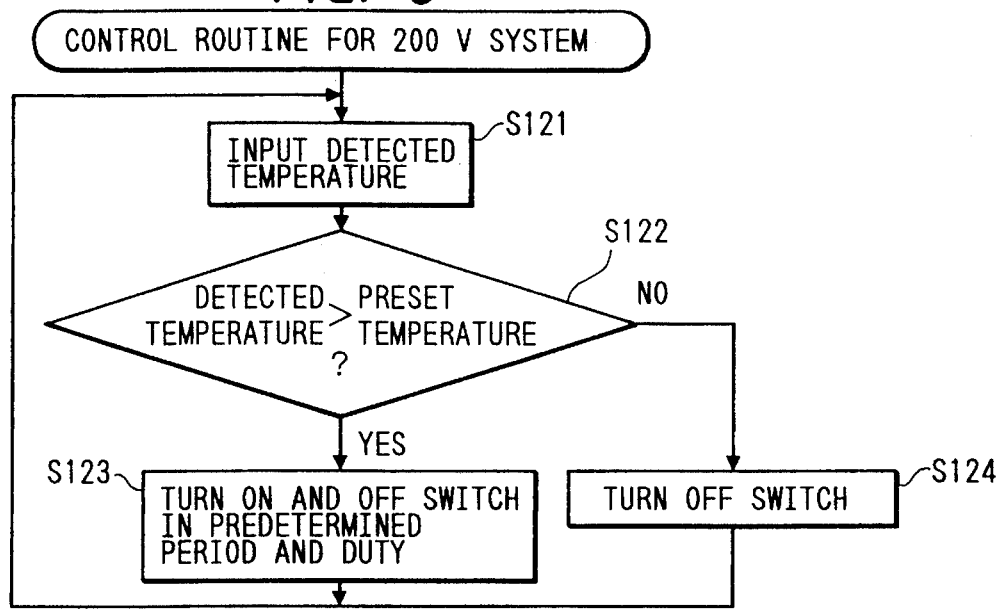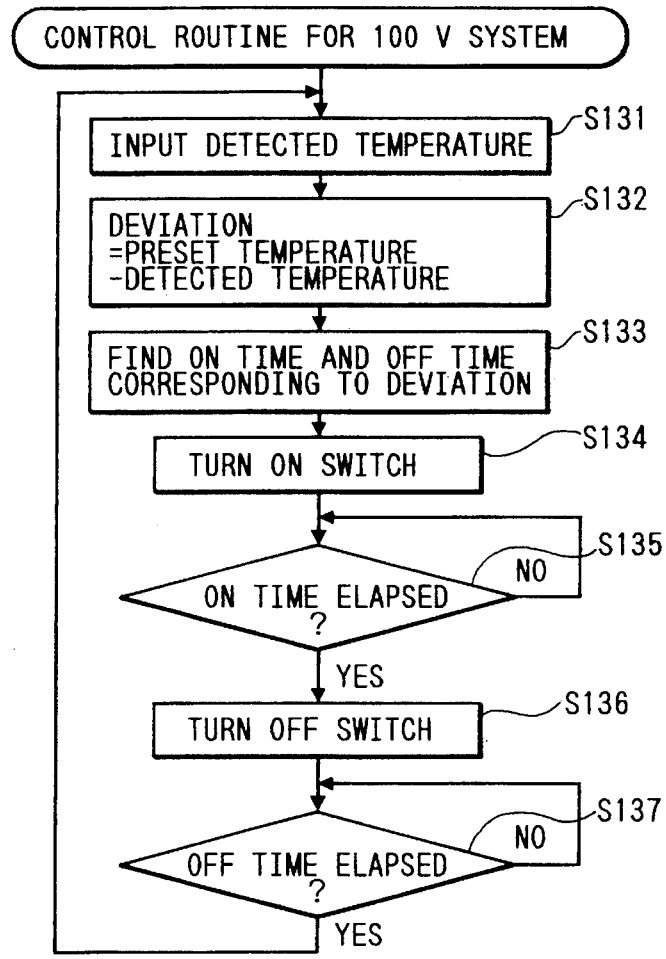

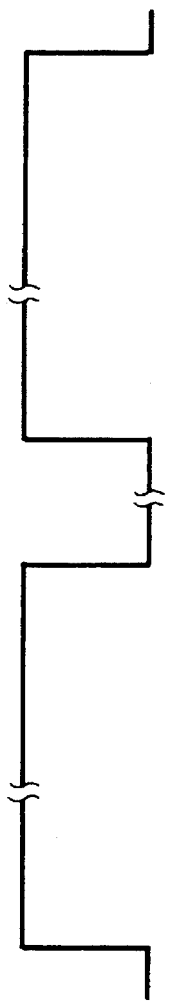
FIG. 9(a) 100 V SYSTEM
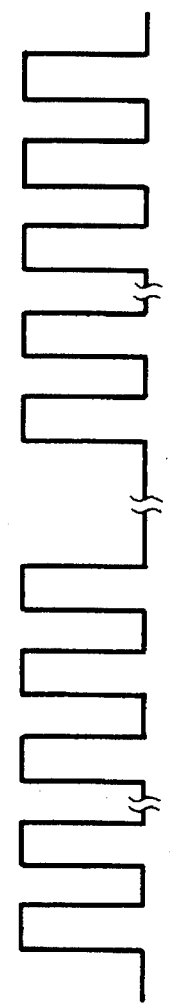
FIG. 9(b) 200 V SYSTEM
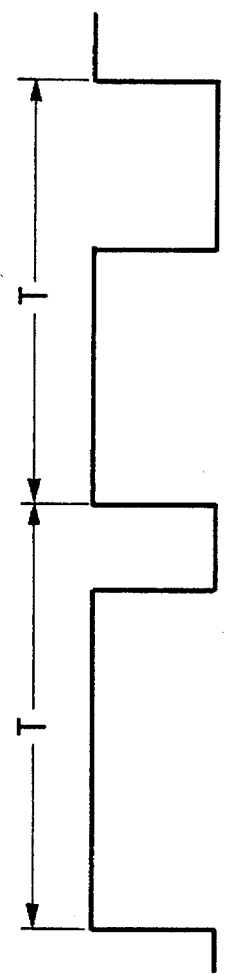
FIG. 11(a) 100 V SYSTEM
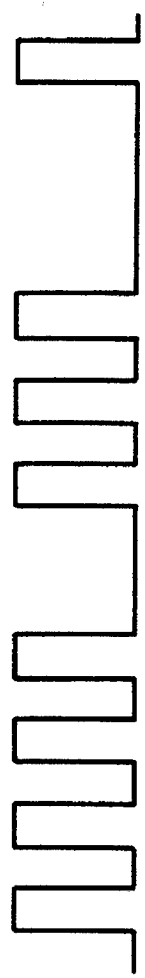
FIG. 11(b) 200 V SYSTEM

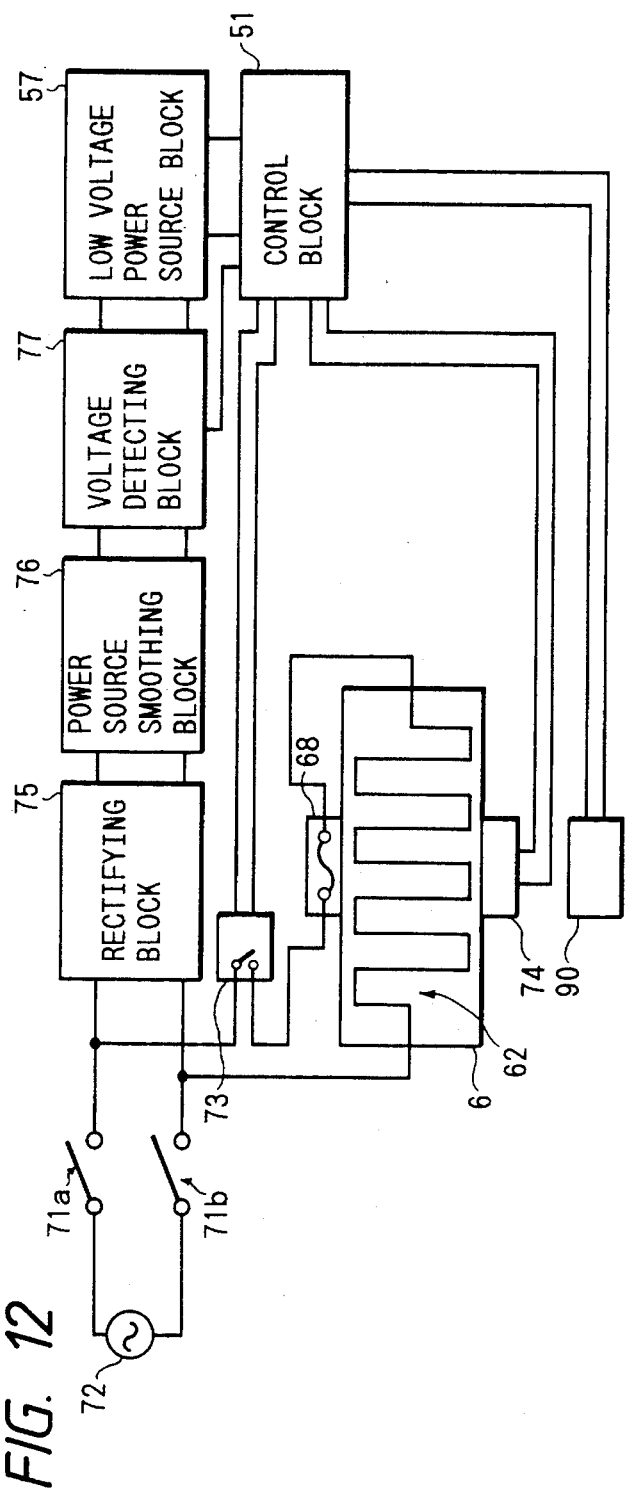
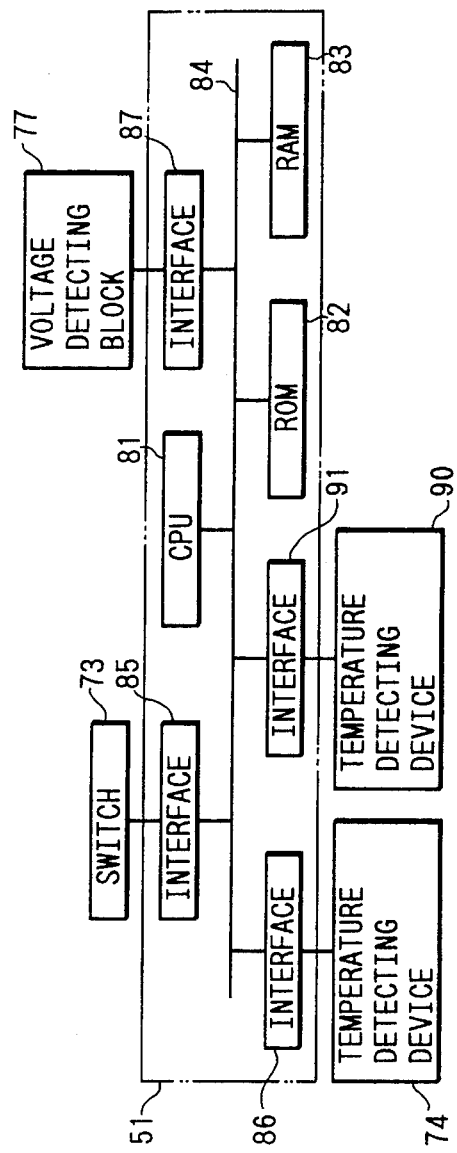
FIG. 12
FIG. 13

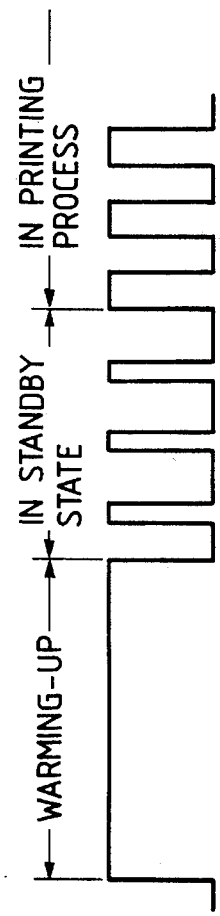
FIG. 15(a) 100V SYSTEM
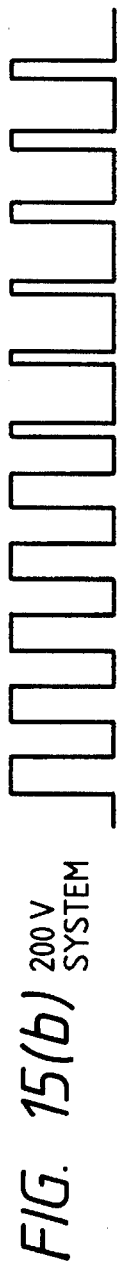
FIG. 15(b) 200V SYSTEM
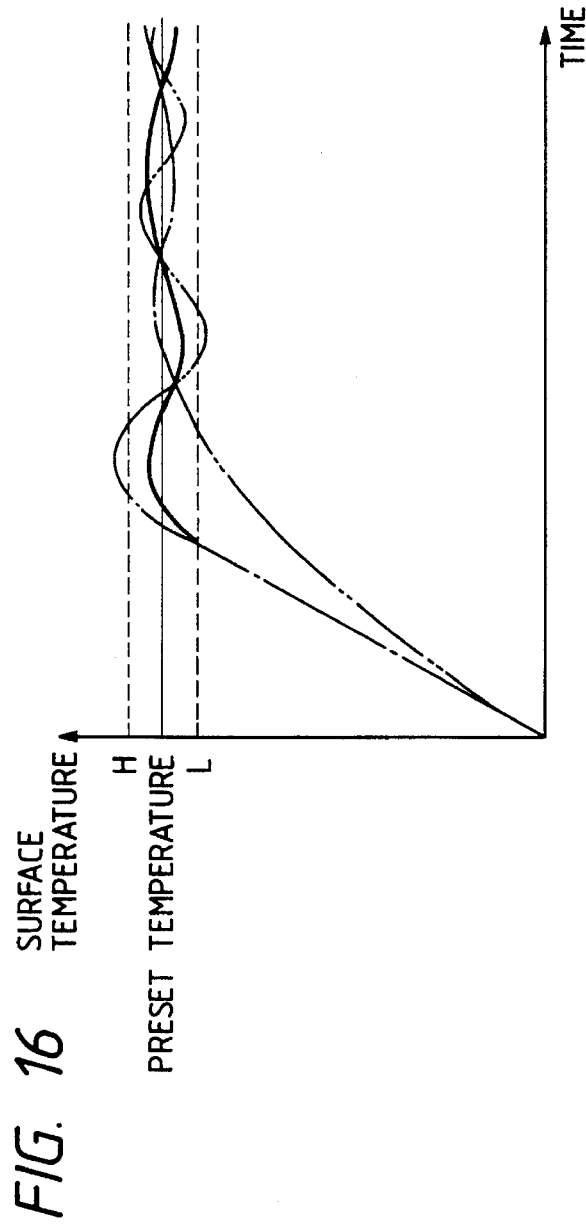
FIG. 16

HEATER CONTROL DEVICE FOR IMAGE FORMING APPARATUS

BACKGROUND OF THE INVENTION

The present invention relates to a heater control device which controls a heater used in an image forming apparatus such as a laser printer, a copying machine, or a facsimile machine, which performs operations for forming an image. More particularly the present invention is directed to a heater control device which can be used in any image forming apparatus regardless of the differing voltage levels of available commercial power provided in various geographic regions of the world.

For example, a laser printer, which records character and picture images by forming electrostatic latent images on a photoreceptor, develops such electrostatic latent images thus formed by applying toner and thereafter transfers the toner images onto printing paper. The laser printer typically fuses the toner image on the printing paper by a heating process using an electric heater such as a heating roller.

An image forming apparatus typically includes electrical component parts, such as transistors and integrated circuits (ICs), which are driven with a direct current power source, and component parts, such as the heater mentioned above, which are driven with an alternating current drive source. Motors and exhaust fans which are used as power sources have been customarily driven with an alternating power source, but have recently come to be driven quite frequently with a direct current power source. This tendency is due to the fact that a direct current power source can achieve higher accuracy in the control of these electrical component parts and also that it can secure the same characteristics of such electrical component parts in geographic regions where the frequency of the commercial power source is 50 Hz, for example, and in geographic regions where the frequency of such a power source is 60 Hz.

In image forming apparatuses, it is frequently found that an alternating current continue to be used as they are even at the present time for heaters and some electrical component parts for such reasons as their consumption of a relatively large amount of electric power and the possibility of their control with alternating current.

In this regard, various kinds of industrial products have come to be distributed extensively throughout the world in recent years, and such products manufactured in one country are often exported to many different countries. Also, it happens quite frequently that such a manufactured product, particularly a small-sized product, is used in a number of countries when its possessor travels from country to country. Under these circumstances, the differences in voltage of the commercial power sources in the individual countries in the world have begun to present problems. For example, the commercial power source in Japan is 100 volts, whereas the voltage of the commercial power source is 115 volts or 120 volts in many areas in the United States, and in the range from 220 to 240 volts in many areas in the Near and Middle East regions, Africa, and Europe. Additionally, it is not rare that the voltage of the commercial power source is different among neighboring countries, and, in fact, there are actual cases in which the voltage of the commercial power source is different among various regions in a single country.

Even under these circumstances related to the voltage of the commercial power sources, the electric products which work with battery cells as their power sources do not require any modification to their power sources for use in different regions. Moreover, the electrical component parts, such as integrated circuits (ICs) and direct current motors, which are operated with direct current power sources, are designed to work with a power source voltage, such as 24 volts or 5 volts, do not therefore require any direct modification to their power source on any region-by-region basis.

However, the electric component parts, such as a fusing unit mentioned above, which are operated with an alternating current power source, cannot be used in common in areas in which the voltage of the available commercial power source is considerably different. For example, if a heater designed for operation at the power source voltage of 100 volts is used in an area where the voltage of 200 volts is used, the heater, switch, and other electric parts will be destroyed by the energy of the excessive current, and some damage to the circuit parts occurs due to the high temperature which results. To the contrary, if a heater designed for operation at the power source voltage of 200 volts is used in an area where the voltage of 100 volts is used, it will not be practical to use the heater since it may suffer from a decline in its ability to generate heat, with the result that the heater fails produce sufficient heat or takes an exceedingly long period of time before it can satisfactorily perform any fusing work.

Therefore, it has hitherto been in practice to make alternating current electrical component parts, such as heaters, which are suitable to the voltage of each commercial power source and to use such component parts selectively in a manner fitting to the voltage of the particular commercial power source. In this situation, it has been necessary until now to manufacture many kinds of electrical component parts to be operated with alternating current for ensuring their compatibility with the voltages in various countries, even though the electrical components for operation with direct current are used in common among the products made for use in different countries. Thus, each image forming apparatus had to be manufactured differently for its exportation to various countries in the world. As a result, there have been problems as relatively high costs of such component parts and considerable difficulties in keeping many different types of component parts in stock. Furthermore, heaters are constructed in such a manner that they are covered with a quartz pipe or the like so that they may be used at as high a temperature as possible, and yet heaters have been faced with the problem that the pipe surface of such a heater is liable to breakage when a person other than a service engineer inadvertently touches it. Thus, it has not been a desirable practice even for a service engineer to take such a heater along with him to deal with a change in the voltage of the power source.

With a view to dealing properly with this problem, there has been proposed a technique for reducing the voltage of the power source to one half by using a transformer in case the voltage of the power source is 200 volts and a technique for providing two heaters connected in parallel in case the voltage of the power source is 100 volts or two heaters connected in series in case the voltage of the power source is 200 volts, so that the power consumption is made equal without any dependence on the voltage of the power source. These techniques are disclosed in in Japanese Patent Unexamined Publication No. Hei. 3-75805.

However, the technique for reducing the voltage of the power source to one half by using a transformer requires a transformer as well as a power relay for switching the input terminals for the primary winding in the transformer for a changeover between the time when the voltage of the power source is 100 volts and the time when it is 200 volts. This requirement results in an increase cost and a larger size of the apparatus.

Also, the technique for switching between the series connection and the parallel connection of two heaters entails an increase in the number of heaters and the number of heater connectors needed for connecting the heaters with the power source, etc. This technique also requires a power relay for switching the heaters between a series connection and a parallel connection and consequently also results in an increase of in the cost and size of the apparatus.

Moreover, it is necessary for an image forming apparatus, such as a laser printer, to maintain the temperature of the heating roller with a built-in heater at an approximately constant temperature in order to secure uniform image quality. For this reason, it has been in practice in the past to perform control with a temperature detecting device in such a manner that the power conducted to the heater is cut off when the detected temperature has risen to or above a preset temperature, but that the power is conducted again to the heater when the detected temperature has fallen below the preset temperature. Yet, such a control presents the problem that violent fluctuations occur in the temperature of the heating roller. Above all, this control causes the problem that an overshoot occurs at the time during which the apparatus warms up.

SUMMARY OF THE INVENTION

Therefore, a first object of the present invention is to provide a heater control device which is constructed in a compact size for use in an image forming apparatus and designed to work with one heater regardless of the voltage level of the available commercial power source.

A second object of the present invention is to provide a heater control device which is constructed in a compact size for use in an image forming apparatus in such a manner that it is capable of minimizing fluctuations in the temperature of the heater.

In order to attain the above objects, the present invention provides a heater control device for an image forming apparatus including a switch for connecting and disconnecting an application of an alternating current voltage to a heater used in an image forming apparatus, and switch control means for varying a period of time for the application of the alternating current voltage to the heater per unit period of time by controlling the switch in accordance with a value of the alternating current voltage applied to the heater.

BRIEF DESCRIPTION OF THE DRAWINGS

The manner by which the above objects and other objects, features and advantages of the present invention are attained will be fully evident from the following detailed description when it is considered in light of the drawings, wherein:

FIG. 8 is a flow chart illustrating the control routine for the 200 volt system shown in FIG. 6;

FIGS. 9(a) and 9(b) are waveform charts each illustrating the waveform of the voltage applied to the heater in the first embodiment of the present invention;

FIG. 10 is a flow chart illustrating the control routine for the 100 volt system in the second embodiment of the present invention;

FIGS. 11(a) and 11(b) are waveform charts each illustrating the waveform of the voltage applied to the heater in the second embodiment of the present invention;

FIG. 12 is a block diagram illustrating the construction of a heater control device in a third embodiment of the present invention;

FIG. 13 is a block diagram illustrating the details of the control block shown in FIG. 12;

FIGS. 15(a) and 15(b) are waveform charts each illustrating the waveform of the voltage applied to the heater in the third embodiment of the present invention; and FIG. 16 is a characteristic chart illustrating the relationship between the duration of time and the temperature on the surface of the heating roller in the first through third embodiments of the present invention.

DETAILED DESCRIPTION OF THE PREFERRED EMBODIMENTS

Figure 1:
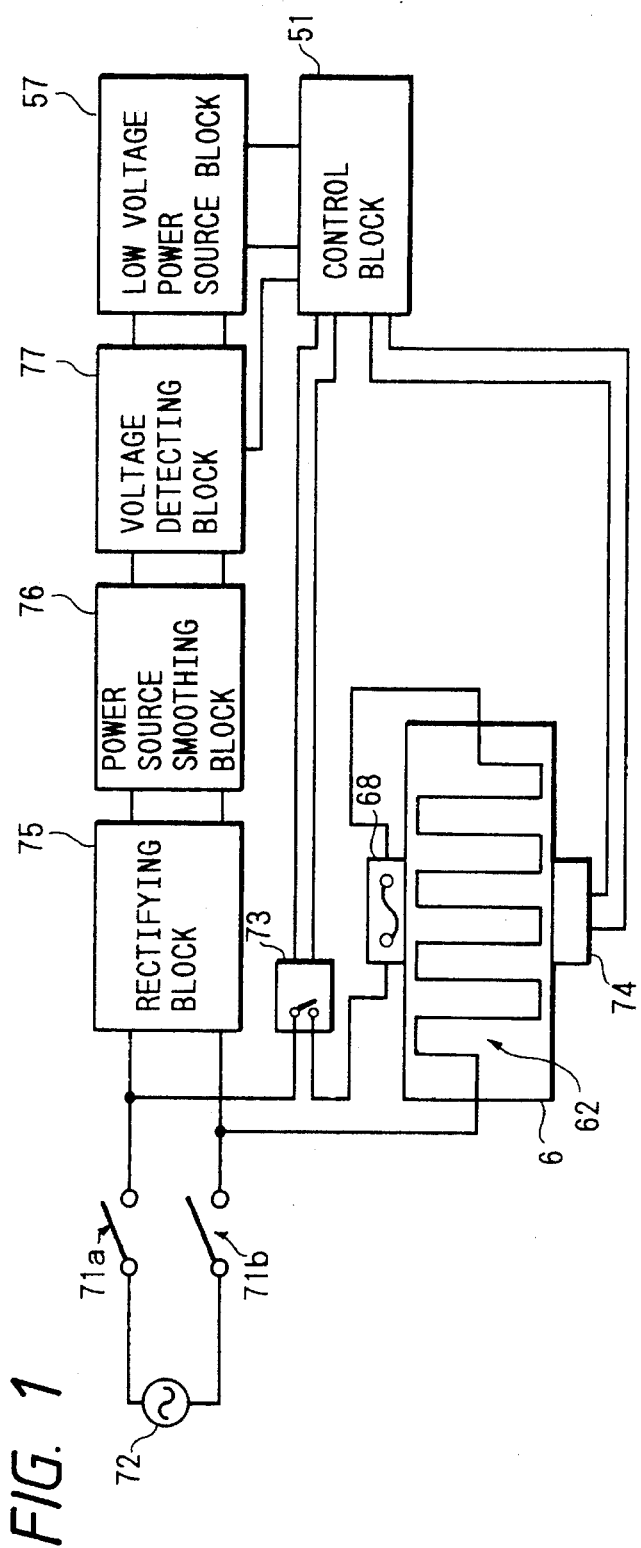
FIG. 1 is a block diagram illustrating the construction of a heater control device according to a first embodiment of the present invention.

Now, preferred embodiments of the present invention will be described with reference to the accompanying drawings, in which like reference characters designate like or corresponding parts throughout the several drawings.

In the description to follow, some embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 2:
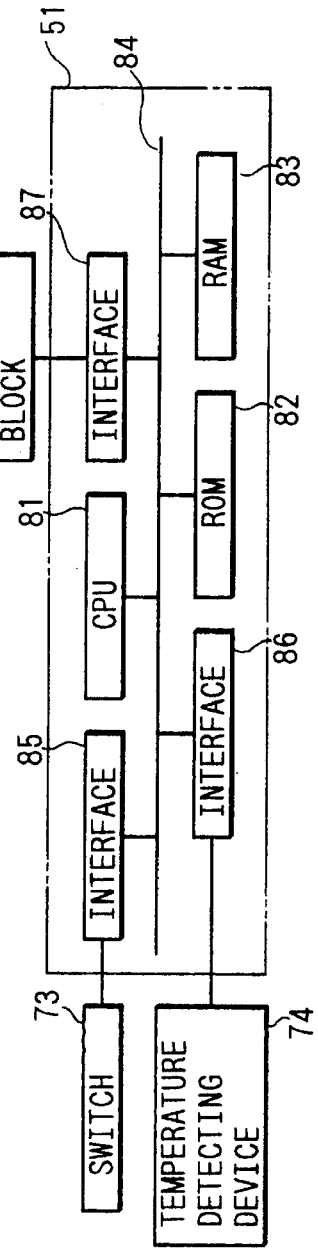
FIG. 2 is a block diagram illustrating the details of the control block shown in FIG. 1.
Figure 3:
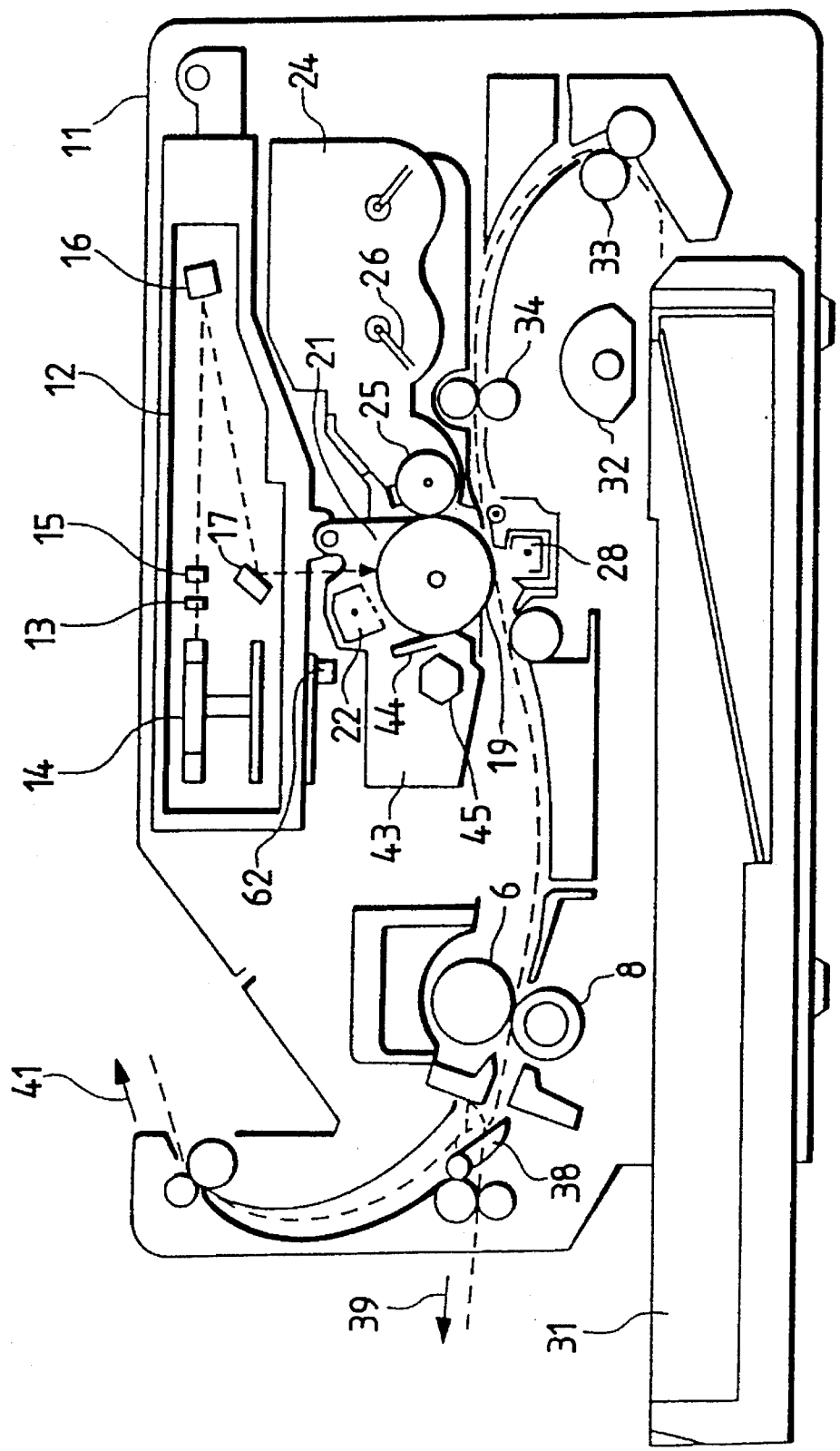
FIG. 3 is an explanatory view illustrating the approximate construction of a laser printer in the first embodiment of the present invention.

FIG. 1 through FIG. 9(b) illustrate a first embodiment of the present invention. FIG. 3 is an explanatory view illustrating the approximate construction of a laser printer as an image forming apparatus. This laser printer 11 is provided with a laser scanning unit 12. A semiconductor laser unit 13, which modulates and outputs a laser beam in accordance with an image signal, is provided in this laser scanning unit 12. A laser beam emitted from this semiconductor laser unit 13 is directed incidentally onto a rotating polygon mirror 14, from which the incident laser beam is deflected in accordance with this rotation. The deflected laser beam passes through an fθ lens 15, has its progressing direction changed thereafter by mirrors 16 and 17, and is output from this laser scanning unit 12.

A photoreceptor drum 19, which rotates at a constant speed, is arranged below the laser scanning unit 12. A laser beam output from the laser scanning unit 12 repeatedly scans a predetermined exposure position 21 on the photoreceptor drum 19 in its axial direction, namely, in the main scanning direction. At a position slightly forward of this exposure position 21, a charging corotron 22 is arranged in opposition to the photoreceptor drum 19, so that the charging corotron 22 may uniformly charge the surface of the photoreceptor drum 19. An electrostatic latent image corresponding to the image information is formed on the surface of the photoreceptor drum 19 as the result of the irradiation of the laser beam on the photoreceptor drum 19 as thus charged. Such a electrostatic latent image is developed by a developing unit 24 on the surface of the photoreceptor drum 19 at the downstream side of the exposure position 21. This developing unit 24 accommodates therein such component parts as a developing roller 25, which performs an operation for developing the electrostatic latent image by magnetically depositing the toner (which is also called "spike formation") on the electrostatic latent image on the surface of the photoreceptor drum 19, and a toner feeding mechanism 26, which supplies the toner contained in a cartridge to the developing roller 25. A predetermined developing bias is applied to the developing unit 24.

The toner image formed in a developing process by the developing unit 24 is moved by the rotation of the photoreceptor drum 19 to a position in which it is faced with a transferring corotron 28, and, in this position, the toner image is transferred electrostatically onto the recording paper (which is ordinary paper).

Here, a brief description will be made of the route for the transport of the recording paper. The recording paper, which is not shown in the accompanying drawings, is stored in lamination in a paper cassette tray 31, which is arranged in a manner permitting its free installation and removal in a lower part of this laser printer 11. The recording paper positioned at the top of the uppermost layer in the paper cassette tray 31 is discharged out of the paper cassette tray 31 by a semilunar roller 32, which is formed in the shape of the half moon. Another means, such as a retarding roller, is used in some cases instead of the semilunar roller 32.

The recording paper thus discharged moves forward by the action of the transporting roller 33 via the route indicated with the broken line and is stopped temporarily at the point of time when it reaches the fore end of a resisting roller 34. After this, an electromagnetic clutch, which is not shown in the drawings, puts the resisting roller 34 into its rotating motion, by which the recording paper starts its forward movement at a constant speed and in a stable manner. Thus, the recording paper passes through the gap between the photoreceptor drum 19 and the transferring corotron 28. Only at this point of time when this passage takes place, the transferring corotron 28 performs its discharging operation, by which the toner image on the photoreceptor drum 19 is attracted in the direction of the transferring corotron 28 by an electrostatic process and the toner image is thereby transferred onto the recording paper. The recording paper bearing the image thus transferred onto it is processed for the discharge of the electrostatic force by means of erasure needles, which is positioned at the downstream side of the transferring corotron 28 (not shown in the drawings), and the recording paper is thereby separated from the surface of the photoreceptor drum 19. The recording paper thus separated is transported to a fusing unit, which comprises a heating roller 6 and a pressure roller 8. In the fusing unit, the recording paper passes through the gap between the heating roller 6 and the pressure roller 8, which are nipping the paper in a predetermined width. At this time, the side of the recording paper onto which the toner image has been transferred will be set at the side of the heating roller 6 while the pressure roller 8 pushes down the recording paper on the heating roller 6, thereby making it possible for the fusing unit to attain an efficient heat transmission. The heating roller 6 is controlled at a constant high temperature. In this condition, the toner image on the recording paper is thermally fixed on the surface of the recording paper.

A switching valve 38, which switches the transport path for the recording paper after its fusing, is provided at the exit side of the fusing unit. By the switching operation by this switching valve 38, the recording paper after the fusing process either moves straight forward to be discharged in a first discharging direction 39 or is transported in a U-shaped route inside the apparatus to be moved in a second discharging direction 41, which is almost reverse to the first discharging direction, and to be discharged from the upper portion of the laser printer 11. The reason why the heater control device is constructed to allow a selection of one out of the two types of discharging directions is that it is intended to serve the purpose of enabling the operator to select the manner of discharge of the recording paper to determine whether the recorded side of the paper is to be set upward or downward when it is discharged. In case the recording paper is discharged with its face set downward by selecting the second discharging direction 41, it will be possible to get the recorded sheets of paper in the sequence as printed and discharged, so that it will be possible to staple them in their regular order.

Now, the toner which has not been transferred onto the recording paper is scraped off from the surface of the photoreceptor drum 19 by means of a cleaning device 43 arranged at the farther downstream side of the transferring corotron 28. A blade 44, which is used to scrape off the residual toner from the surface of the photoreceptor drum 19, and a rotating body 45, which removes the toner particles deposited on the lower side of the blade 44 and puts the collected toner into a storing place in the rear area, are provided on the cleaning device 43.

Figure 4:
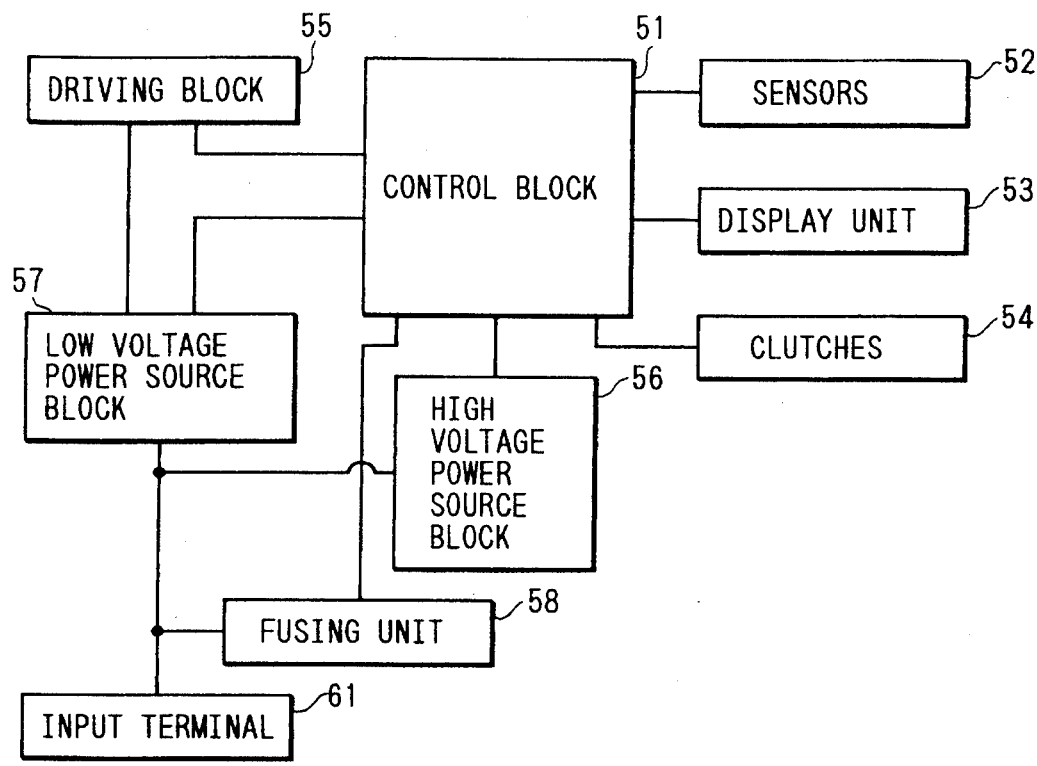
FIG. 4 is a block diagram illustrating the principal parts of the circuitry in the laser printer shown in FIG. 3.

FIG. 4 is a block diagram illustrating the principal parts in the circuitry of the laser printer constructed in the manner described above. This laser printer 11 is provided with a control block 51 equipped with a central processing unit (which will be called "CPU" in the subsequent part). The control of the control block 51 is performed by a program written in a built-in read-only memory (which will be called "ROM" in the subsequent part). The control block 51 has various types of circuit component parts connected to it. That is to say, sensors 52, which check the condition of the transport of the recording paper, a display unit 53, which is arranged on an operating panel not illustrated in the drawings, and various types of clutches 54 and a driving block 55, which perform control on the driving operations, are connected to the control block 51. In addition, a high voltage power source block 56 for supplying high voltage to the charging corotron 22 and so forth mentioned above, a low voltage power source block 57 for supplying low voltage to a printed circuit board, etc., not shown in the drawings, an a fusing unit 58, which performs control on the electric power of the heating roller 6 mentioned above, are connected with this control block 51. The high voltage power source block 56, the low voltage power source block 57, and the fusing unit 58 are constructed so as to be connected with the alternating current power source by way of an alternating current input terminal 61.

Figure 5:
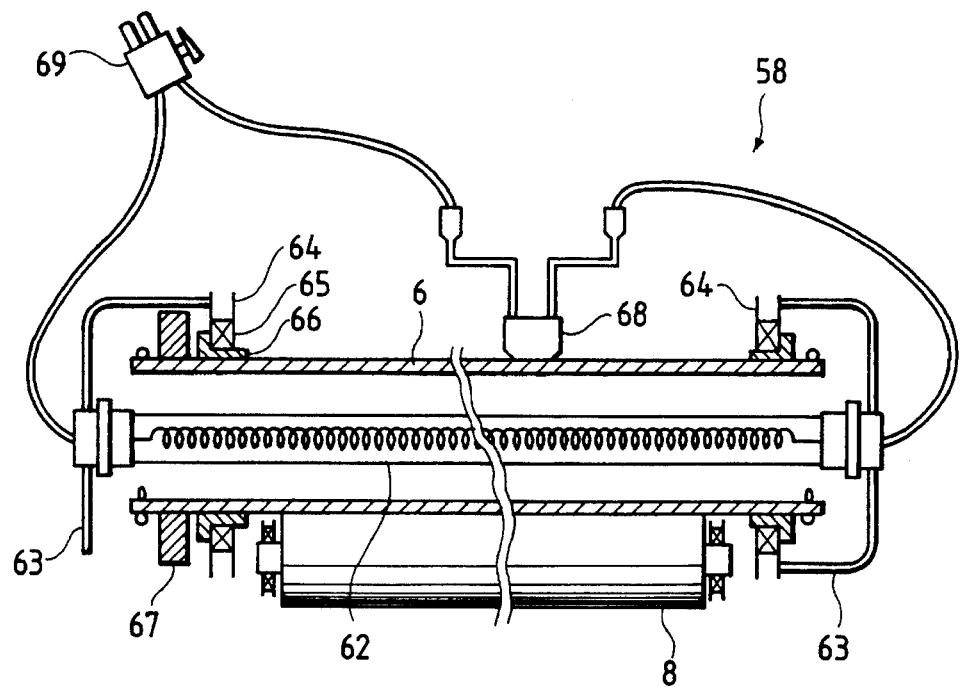
FIG. 5 is an explanatory view illustrating the construction of the fusing unit in the laser printer shown in FIG. 3.

FIG. 5 illustrates the mechanical construction of the fusing unit 58. This fusing unit 58 has a heater 62, which is fixed on its supporting plates 64 and 64 with a pair of lamp supports 63 and 63. The supporting plates 64 are arranged to support a collar 66 for the heating roller 6 via a bearing 65. The heating roller 6 is a metal cylinder coated with heatresistant resin and receives motor power by engaging a gear not illustrated in the drawings with a gear 67 fixed at one end thereof, so that the heating roller 6 is rotated at a predetermined speed. A fuse 68 is set in light contact with the surface of the heater roller 6. The fuse 68 monitors the temperature on the surface of the heating roller 6. One end of the alternating current power source is connected via connector 69 with one end (the left end as shown in FIG. 5) of the heater 62, and the other end of the alternating current power source is connected with the other end of heater 62 (the right end as shown in FIG. 5) by way of the fuse 68. The fuse 68 is used in order to cut off the electric power conducted to the heater 62 when the heating roller 6 is heated abnormally by one cause or another.

The pressure roller 8 is in contact under pressure with the heating roller 6, thereby forming a nipping zone in a predetermined width. The toner image is thermally fixed on the recording paper (not illustrated in FIG. 5) when the paper passes through this nipping zone.

Next, description will be made of the heater control device in this embodiment of the present invention. FIG. 1 is a block diagram illustrating the construction of the heater control device. The heater 62 is connected with the alternating current power source 72 by way of power source switches 71a and 71b. Between the power source switch 71a and the heater 62, a switch 73, Which uses a solid state relay, for example, and the fuse 68 are interposed in series. The switch 73 is designed to be controlled to perform its ON and OFF operations by the control block 51. Also, a temperature detecting device 74 is held in light contact with the surface of the heating roller 6, which has the heater 62 built into it, so that the temperature detecting device 74 detects the temperature on the surface of the heating roller 6. The results of detection by this temperature detecting device 74 are supplied into the control block 51.

Also, a rectifying block 75, a power source smoothing block 76, and a voltage detecting block 77 are provided in the stated order, as viewed from the side of the power source switches 71a and 71b, between the power source switches 71a and 71b and the low voltage power source block 57. Thus, an alternating current supplied from the alternating current power source 72 is rectified in the rectifying block 75 and smoothed in the power source smoothing block 76, and supplied into the low voltage power source block 57 after passing through the voltage detecting block 77. A direct current voltage which is generated at a low voltage from this low voltage power source block 57 is fed into the control block 51 and so forth. The voltage detecting block 77 detects the value of the input voltage, and the detected results are supplied into the control block 51.

FIG. 2 is a block diagram illustrating the details of the control block 51. This control block 51 is provided with a central processing unit 81 (which will be called "CPU" in the subsequent part), a read-only memory 82 (which will be called "ROM" in the subsequent part), and a random access memory 83 (which will be called "RAM" in the subsequent part), which are connected with one another by a bus 84. A switch 73, the temperature detecting device 74, and the voltage detecting block 77 are connected with the bus 84 via interfaces 85, 86, and 87, respectively. Moreover, the control block 51, which is thus comprised of the CPU 81, the ROM 82, the RAM 83, the interfaces 85, 86, and 87, is constructed, for example, with a single chip microcomputer. In this regard, the sensors 52 and so forth as shown in FIG. 4 are additionally connected with this control block 51 though they are not shown in FIG. 2. The CPU 81 is designed to operate in accordance with a program stored in the ROM 82 to perform control on the overall operations of the laser printer as a whole in addition to its performance of control on the switch 73. The RAM 83 is designed to store temporary data necessary for these controlling operations.

Next, the operations of the heater control device in this embodiment will be described with reference to FIG. 6 through FIG. 9(b).

Figure 6:
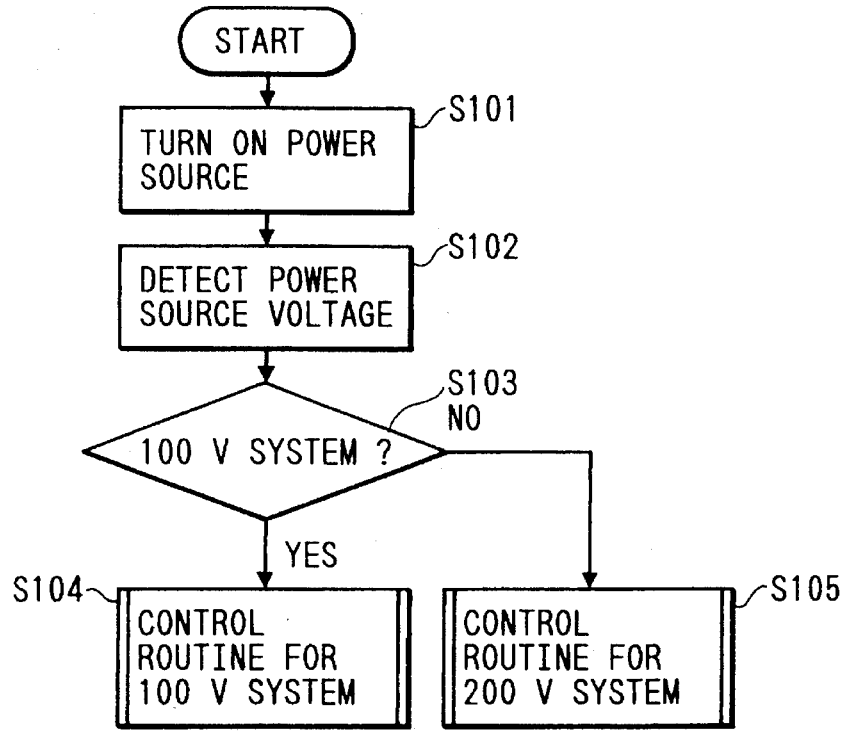
FIG. 6 is a flow chart illustrating the principal operations of the heater control device in the first embodiment of the present invention.

FIG. 6 is a flow chart illustrating the principal operations of the heater control device. As shown in FIG. 6, an alternating current from the alternating current power source 72 is put into the voltage detecting block 77, after being converted into a direct current by passing the current through the rectifying block 75 and the power source smoothing block 76. When the power source switches 71a and 71b are turned ON in step S101. This voltage detecting block 77 detects the voltage value of the alternating current power source by detecting this input voltage in step S102. The result of this detection is fed into the control block 51. This control block 51 finds whether the alternating current power source is of the 100 volt system or not, namely, whether the power source is of the 100 volt system or the 200 volt system, in step S103. Here, an alternating current power source of the 100 volt system designates one in the proximity of 100 volts, for example, in the range from 100 volts to 125 volts, and an alternating current power source in the 200 volt system represents one in the proximity of 200 volts, for example, in the range from 200 volts to 250 volts. Then, the control block 51 executes the 100 volt system control routine in step S104 in case the alternating current power source is found to be of the 100 volt system (in the case of YES in step S103), but executes the 200 volt system control routine in step S105 in case the alternating current power source is found to be of the 200 volt system (in the case of NO in step S103).

Figure 7:
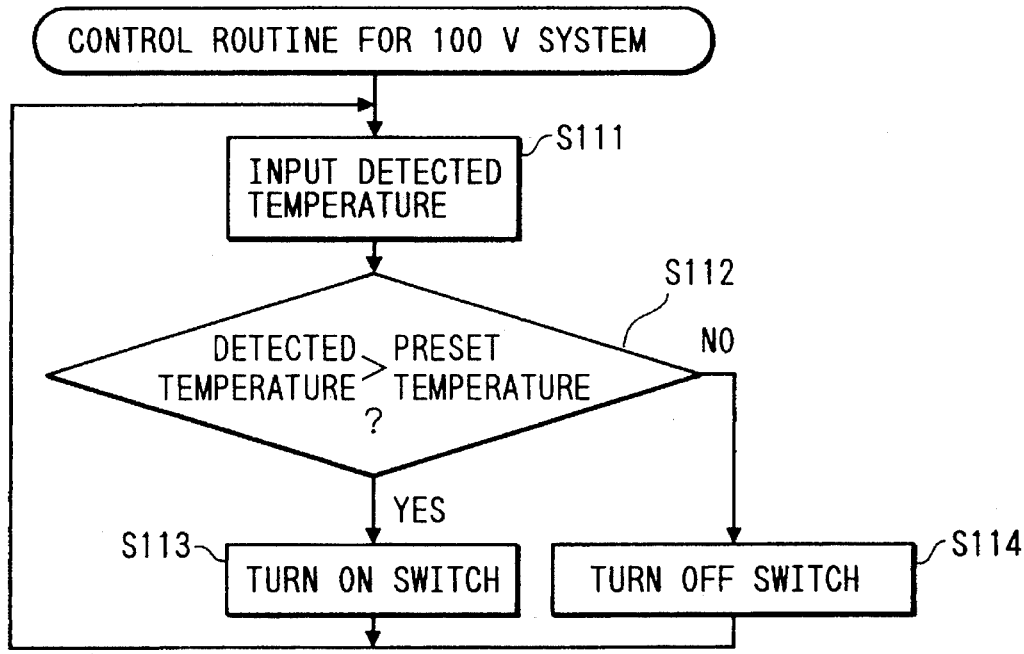
FIG. 7 is a flow chart illustrating the control routine for the 100 volt system shown in FIG. 6.

FIG. 7 is a flow chart illustrating the control routine for the 100 volt system shown in FIG. 6. In this control routine, the control block 51 first furnishes in step S111 the input of the temperature detected by the temperature detecting device 74 and then determines in step S112 whether or not this detected temperature is lower than the preset temperature. In this regard, the term "preset temperature" means a temperature which has been set as the optimum temperature for the temperature on the surface of the heating roller 6. In case the detected temperature is lower than the preset temperature (in the case of YES in step S112), the control block 51 turns ON the switch 73 in step S113 and then returns to step S111, but turns OFF the switch 73 and returns to step S111 in case it is found that the detected temperature is equal to or higher than the preset temperature (in the case of NO in step S112). By repeating the operations described above, the control block 51 controls the application of the alternating current voltage to the heater 62 in such a manner that the temperature on the surface of the heating roller 6 will be equal to the preset temperature.

FIG. 8 is a flow chart illustrating the control routine for the 200 volt system shown in FIG. 6. In this routine, the control block 51 first furnishes in step S121 the input of the temperature detected by the temperature detecting device 74, as in the case of the control routine for the 100 volt system, and, then in step S122, the control block 51 determines whether or not this detected value is lower than the preset temperature. In case the detected temperature is found to be lower than the preset temperature (in the case of YES in step S122), the control block 51 starts in step S123 the operations for turning ON and OFF the switch 73 in a predetermined cyclic period and in a predetermined duty cycle (hereafter simply referred to as "duty") and then returns to step S121. Moreover, the predetermined cyclic period is approximately 500 milliseconds, and the duty is 50%, for example. On the other hand, the control block 51 turns OFF the switch 73 in step S124 and returns to step S121 in case the detected temperature is equal to or higher than the preset temperature (in the case of NO in step S122). By repeating the operations mentioned above, the control block 51 controls the application of the alternating current voltage to the heater 63 in such a manner that the temperature on the surface of the heating roller 6 be equal to the preset temperature.

FIG. 9(*a*) illustrates the waveform of the voltage applied to the heater 62 in the control routine for the 100 bolt system while FIG. 9(*b*) illustrates the waveform of the voltage applied to the heater 62 in the control routine for the 200 volt system. As it can be understood with reference to these charts, the duration of time for the application of the alternating voltage to the heater 62 per unit period of time will be shorter by 50% in case the alternating current power source is of the 200 volt system as compared with the case in which the alternating current power source is of the 100 volt system. Accordingly, the heater control device as described in this embodiment can make the consumption of electric power by the heater 62 per unit period of time equal between the case in which the alternating current power source is of the 100 volt system and the case in which the alternating current power source is of the 200 volt system, so that it is possible to use the laser printer incorporating the heater control device in various countries in the world without taking any such measure as the replacement of the heater.

Moreover, the present embodiment offers a heater control device which operates satisfactorily with only one heater 62 and also renders it unnecessary to use any of such component parts as a power relay, a transformer, and a heater connector, which entail an increase in the cost of the apparatus and in its size.

Next, description will be made of a second embodiment of the present invention. FIG. 10 and FIGS. 11(*a*) and 11(*b*) relate to the second embodiment of the present invention, and FIG. 10 is a flow chart illustrating the control routine for the 100 volt system described in the second embodiment. FIGS. 11(*a*) and 11(*b*) are waveform charts each illustrating the waveform of the voltage applied to the heater in this embodiment.

In this embodiment, the construction of the heater control device is identical to that described in the first embodiment, and yet the operations of the control routine for the 100 volt system and the control routine for the 200 volt system are different from those of the corresponding routines described in the first embodiment. As shown in FIG. 10, the control routine for the 100 volt system described in this embodiment is organized in such a manner that the control block 51 first furnishes in step S131 the input of the temperature detected by the temperature detecting device 74 and then in step S132 the control block 51 finds the difference between the preset temperature and the detected temperature in the form of a deviation. Next, in step S133, the control block 51 finds the ON time and the OFF time in a predetermined cyclic period T in correspondence with the deviation. Then, in step S134, the control block 51 turns ON the switch 73 and repeats the operation in step S135 for determining whether or not the ON time found in step S133 has elapsed, and, if it is found that the ON time has elapsed, the control block 51 takes step S136 at which it turns OFF the switch 73. Next, in step S137, the control block 51 repeats the operation for determining whether or not the OFF time found in step S133 has elapsed, and, if the OFF time has elapsed, then the control block 51 returns to step S131 and repeats the operations described above. In this regard, the relationship between the deviation on one hand and the ON time and the OFF time on the other is such that the ON time is extended according as the deviation increases and that the OFF time is to be the time found by subtracting the ON time from the cyclic period T. Also, the cyclic period T is to be approximately 30 seconds, for example.

In the meantime, the operations of the control routine for the 200 volt system are the same as those shown in FIG. 10 with the exception of step S134 shown in FIG. 10, which is replaced with a step for starting the operations for turning ON and OFF the switch 73 in a predetermined cyclic period and in a predetermined duty in the same manner as in step S123 shown in FIG. 8.

FIG. 11(*a*) illustrates the waveform of the voltage applied to the heater 62 in the control routine for the 100 volt system in this embodiment while FIG. 11(*b*) illustrates the waveform of the voltage applied to the heater 62 in the control routine for the 200 volt system. As it can be understood from these drawings, the control block 51 sets up a voltage applicable period in accordance with the deviation between the preset temperature and the detected temperature for either of the 100 volt system and the 200 volt system. In contrast with the case of the 100 volt system in which the alternating current voltage is applied to the heater 62 continuously in the voltage applicable period, the case of the 200 volt system works with the application of the alternating current voltage to the heater 62 intermittently in a predetermined cyclic period and in a predetermined duty in the voltage applicable period.

Thus, in this embodiment, the period for the application of the alternating current voltage to the heater 62 per unit period of time is varied in accordance with the deviation between the preset temperature and the detected temperature. By this, fluctuations in the temperature of the heating roller 6 can be reduced. Above all, the change in the temperature will be smoother according as the temperature on the surface of the heating roller 6 is closer to the preset temperature, and it will be possible to prevent an overshoot.

Moreover, this embodiment is formed in such a manner that the control block 51 sets the ON time and the OFF time in the predetermined cyclic period T in accordance with the deviation, it is feasible to set a fixed OFF time and to vary only the ON time in accordance with the deviation. In addition, in the case of the 200 volt system, an alternating current may be applied to the heater 62 continuously for a duration corresponding to one half of the voltage applicable period in the case of the 100 volt system instead of the intermittent application of an alternating voltage to the heater 62 in a predetermined cyclic period and in a predetermined duty.

The construction and operation of the other parts of the heater control device in this embodiment are the same as those of the corresponding parts as described in the first embodiment.

Next, description will be made of a third embodiment of the present invention. FIG. 12 through FIG. 15(*b*) relate to the third embodiment.

FIG. 12 is a block diagram illustrating the construction of the heater control device in this embodiment. The heater control device in this embodiment is further provided with a temperature detecting device 90 installed in the proximity of the heating roller 6 in the construction of the first embodiment. This temperature detecting device 90 is constructed in such a manner that it detects the temperature in the circumference of the heating roller 6 and supplies the detected results into the control block 51.

FIG. 13 is a block diagram illustrating the details of the control block 51 shown in FIG. 12. In this embodiment, the control block 51 is the same as that of the first embodiment except for the point that it is provided with an interface 91 for connecting the above-mentioned temperature detecting device 90 with the bus 84.

Figure 14:
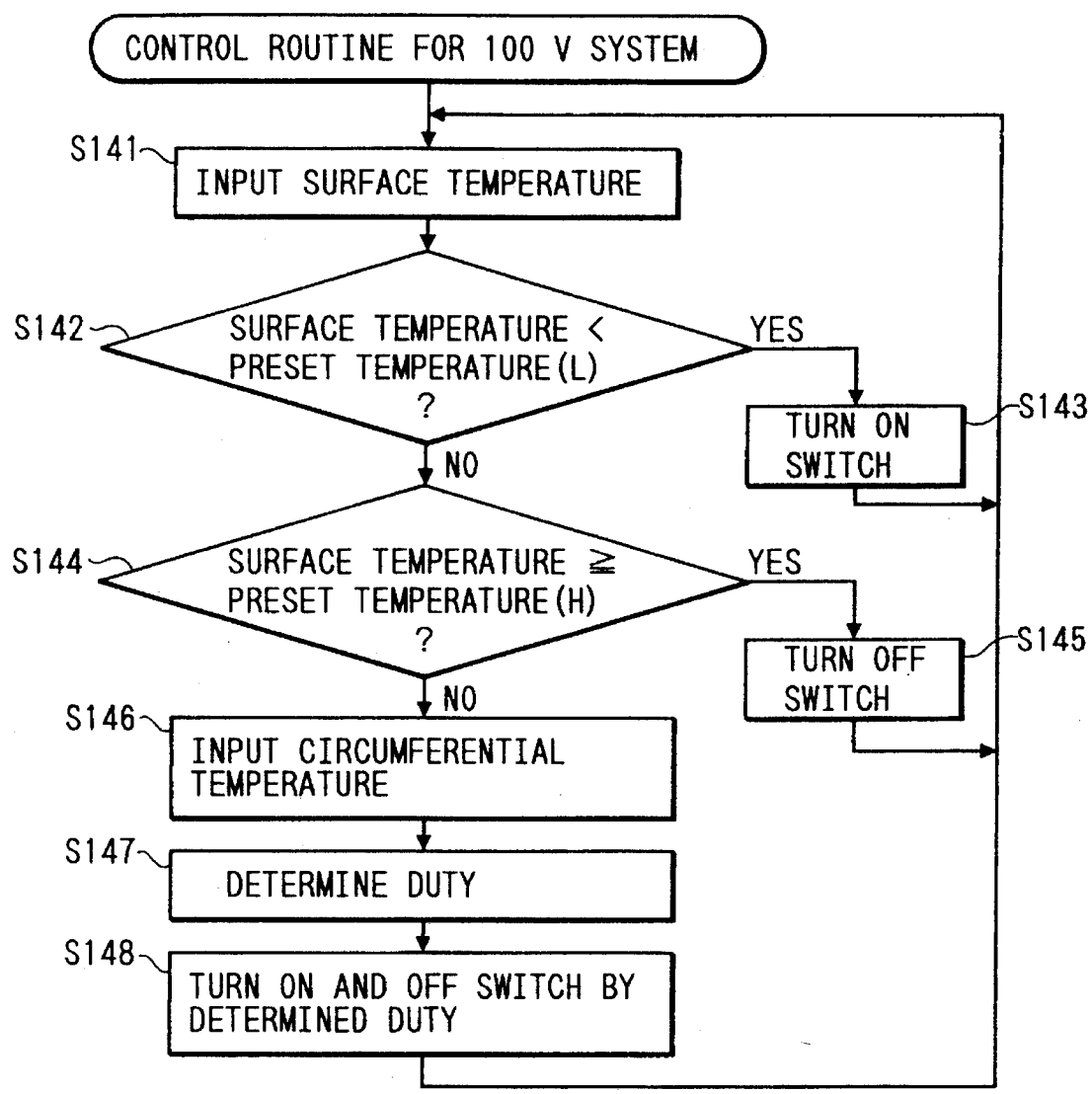
FIG. 14 is a flow chart illustrating the control routine for the 100 volt system in the third embodiment of the present invention.

FIG. 14 is a flow chart illustrating the control routine for the 100 volt system in this embodiment of the present invention. As shown in FIG. 14, the control block 51 first takes step S141, in which the control block 51 gives the input of the temperature on the surface of the heating roller 6 as detected by the temperature detecting device 74 and, then in step S142, the control block 51 determines whether or not detected surface temperature is lower than the preset temperature (L). Moreover, the preset temperature (L) is to be set at a temperature slightly lower than the temperature optimum for the surface temperature of the heating roller 6. In case the detected surface temperature is lower than the preset temperature (L) (in the case of YES in step S142), the control block 51 turns ON the switch 73 in step S143 and returns to step S141, and, in case the surface temperature is equal to or higher than the preset temperature (L) (in the case of NO in step S142), the control block 51 determines in step S144 whether or not the surface temperature is equal to or higher than the preset temperature (H). In this regard, the preset temperature (H) is to be set at a temperature slightly higher than the temperature optimum as the surface temperature for the heating roller 6. In case the surface temperature is equal to or higher than the preset temperature (H) (in the case of YES in step S144), the control block 51 turns OFF the switch 73 in step S145 and returns to step S141, but, in case the surface temperature is lower than the preset temperature (H) (in the case of NO in step S144), the control block 51 operates in step S146 to furnish the input of the temperature in the circumference of the heating roller 6 as detected with the temperature detecting device 90. Then, in step S147, the control block 51 determines a duty, which is dependent on this circumferential temperature, the point whether the laser printer is in a printing operation or in a standby state, or the point whether the applied voltage is of the 100 volt system or of the 200 volt system. Then, in step S148, the control block 51 starts the operations for turning ON and OFF the switch 73 in a predetermined cyclic period and in the duty determined in step S147, and then returns to step S141. In this regard, the predetermined cyclic period for this operation is shorter than the cyclic period T in the second embodiment and to be approximately 500 milliseconds, for example.

Moreover, the duty to be determined in step S147 is to be set in such a way that it will became larger as the circumferential temperature declines. Also, since the heat of the heating roller 6 is reduced by the recording paper passing through it in the process of a printing operation, the duty should be set larger, for example, three times as much, as compared with the duty to be set for the period in which the printer is in its standby state. Also, the CPU 81, which controls the operations of the laser printer in accordance with a program, recognizes whether the printer is in a printing operation or in its standby state.

According to the operation performed in the manner just described, the control block 51 applies an alternating current to the heater 62 continuously at the time of a warming-up until the temperature on the surface of the heating roller 6 attains the preset temperature (L), but, when the temperature on the surface of the heating roller 6 attains the preset temperature (L), the control block 51 applies an alternating current intermittently to the heater 62 at the duty which is to be determined on the basis of the temperature in the circumference of the heating roller 6, the point whether or not the printer is in its standby state, and the point whether the applied alternating current is of the 100 volt system or of the 200 volt system, and the temperature on the surface of the heating roller 6 is thereby maintained in the proximity of the preset temperature. When this surface temperature deviates to some extent from the optimum preset temperature, falling below the preset temperature (L), the control block 51 again applies an alternating current voltage continuously to the heater 62, stopping the application of the alternating current voltage to the heater 62 when the temperature on the surface of the heating roller 6 rises to or above the preset temperature (H), so that the temperature on the surface of the heating roller 6 may resume a level in the proximity of the preset temperature.

In the meantime, the operations in the control routine for the 200 volt system are the same as those shown in FIG. 14 with the exception that step S144 shown in FIG. 14 is replaced with steps for starting the operations for turning ON and OFF the switch 73 in a predetermined cyclic period and in a predetermined duty in the same manner as in step S123 shown in FIG. 8. This operation in the 200 volt system is as shown in FIG. 15(b). Moreover, the duty which is determined in step S147 is to be smaller for the 200 volt system than that for the 100 volt system and is to be set, for example, at one half of the duty for the 100 volt system.

Here, the operations of the first through third embodiments of the present invention will be compared with reference to FIG. 16. FIG. 16 is a characteristic chart illustrating the relationship between the duration of time and the temperature on the surface of the heating roller 6 in the first through third embodiments of the present invention. In FIG. 16, the single-dotted chain line indicates the operation of the first embodiment, the two-dotted chain line indicates the operation of the second embodiment, and the solid line indicates the operation of the third embodiment.

As shown in FIG. 16, an alternating current voltage is applied continuously to the heater 62 until the temperature on the surface of the heating roller 6 attains the preset temperature in the case of the 100 volt system, which is taken as an example here, in the first embodiment, but, as the application of the alternating current voltage to the heater 62 is performed intermittently with the preset temperature working as a borderline after the surface temperature of the heating roller 6 attains the preset temperature, an overshoot is liable to occur at the time of a warming-up operation and it takes time for the heating roller 6 to attain a stabilized state in its surface temperature. In contrast with this, the second embodiment is capable of changing the duration of time for the application of an alternating current voltage to the heater 62 per unit period of time in accordance with a deviation between the preset temperature and the temperature on the surface of the heating roller 6, so that the temperature change will become smoother as the temperature on the surface of the heating roller 6 attains a closer approximation of the preset temperature at the time of a warming-up operation. Thus, it is possible for the construction in the second embodiment to prevent the occurrence of an overshoot and also to reduce the fluctuations in the temperature on the surface of the heating roller 6. However, the time needed for the surface temperature of the heating roller 6 to attain the preset temperature will be longer than the corresponding duration of time in the case of the first embodiment. In comparison with this, the third embodiment features a construction in which an alternating current voltage is applied continuously to the heater until the temperature on the surface of the heating roller 6 attains the preset temperature (L) and, when the surface temperature of the heating roller 6 attains the preset temperature (L), an alternating current voltage is applied intermittently to the heater 62 in such a duty as is determined by the temperature in the circumference of the heating roller 6, the point whether the printer is in a printing operation or in a standby state, and the point whether the applied alternating current voltage is of the 100 volt system or of the 200 volt system. Consequently the construction described in the third embodiment is capable of reducing the duration of time to be taken before the surface temperature of the heating roller 6 attains a temperature level in the proximity of the preset temperature to a duration of time approximately as short as that corresponding duration of time needed in the first embodiment and is further capable of reducing the fluctuations in the surface temperature of the heating roller 6 in the same manner as achieved in the second embodiment. In addition, the construction in the third embodiment operates with a shorter cyclic period for changes in the duty for the application of an alternating current voltage to the heater 62 as compared with the second embodiment, and this shorter period for a change in the duty can reduce the fluctuations in the temperature than is the case with the second embodiment.

Again, the third embodiment is designed in such a manner that it determines the duty for the application of an alternating current voltage to the heater 62 not on the basis of the temperature on the surface of the heating roller 6 but on the basis of the temperature in the circumference of the heating roller 6. The temperature on the surface of the heating roller 6 is liable to temporary fluctuations due to the point whether the printer is in the process of a printing operation or in a standby state, and it is probable that the control may fall into an unstable state if the duty is changed frequently on the basis of such a change in the state of the printer. In contrast with this, the third embodiment varies the duty on the basis of the temperature in the circumference of the heating roller 6, which shows smaller temporary fluctuations, it is therefore possible for the construction in the third embodiment to provide more stable control. In this regard, the construction of the heater control device in the second embodiment is designed to change the duty on the basis of the temperature on the surface of the heating roller 6, but the cyclic period T is approximately 30 seconds, that is, a relatively long period, the heater control device is therefore liable to significantly less influence exerted by the temporary fluctuations in the temperature on the surface of the heating roller 6.

Also, the operations in the first through third embodiments in a case where the applied alternating current voltage is of the 200 volt system are the same as those shown in FIG. 16.

The construction, operation, and effect of the other parts of the third embodiment are the same as those of the corresponding parts in the first embodiment.

Moreover, the present invention is not limited to the embodiments described above, but may be modified in such a way that the heater control device is further provided with a manually operated changeover switch which can be operated for a changeover based on the point whether the applied alternating current voltage is of the 100 volt system or of the 200 volt system, without being provided with the voltage detecting block 77, and that the duration of time for the application of an alternating current voltage to the heater 62 per unit period of time is controlled by the control block 51 on the basis of the information furnished by this changeover switch. Moreover, each of the embodiments shows a construction which uses software for the performance of the control of the switch 73 on the basis of the detected temperature and so forth, but the control may of course be performed with hardware.

Furthermore, the present invention can be applied effectively not only to a laser printer but also to all types of image forming apparatuses which work for the formation of images, such as a copying machine and a facsimile machine.

What is claimed is:

1. A heater control device for an image forming apparatus comprising:

a switch for connecting and disconnecting an application of an alternating current voltage to a heater used in an image forming apparatus, the alternating current voltage being received from a commercial power source;

a temperature detecting device provided in the proximity of the heater for detecting the ambient temperature in the proximity of said heater; and switch control means for varying a period of time for the application of the alternating current voltage to the heater per unit period of time by controlling said switch in accordance with a value of the alternating current voltage received from the commercial power source and a temperature detected by said temperature detecting device.

2. The heater control device as defined in claim 1, wherein said switch control device sets a period of time available for the application of the alternating current voltage in accordance with the temperature detected by said temperature detected by said temperature detecting device, and varies the period of time for the application of the alternating current voltage to the heater in the period of time available for the application of the alternating current voltage in accordance with the value of the alternating current voltage received from the commercial power source.

3. A heater control device for an image forming apparatus comprising:

a switch for connecting and disconnecting an application of an alternating current voltage to a heater used in an image forming apparatus, the alternating current voltage being received from a commercial power source;

a first temperature detecting device for detecting a temperature on a surface of the heater;

a second temperature detecting device for detecting the a temperature in a circumference of the heater; and switch control means for varying a period of time for the application of the alternating current voltage to the heater per unit period of time by controlling said switch in accordance with a value of the alternating current voltage received from the commercial power source until the temperature detected by said first temperature detecting device attains a predetermined temperature, and for varying a period of time for the application of the alternating current voltage to the heater per unit period of time by controlling said switch in accordance with a value of the alternating current voltage received from the commercial power source and the temperature detected by said second temperature detecting device after the temperature detected by said first temperature detecting device has attained the predetermined temperature.

* * * * *

UNITED STATES PATENT AND TRADEMARK OFFICE
CERTIFICATE OF CORRECTION

PATENT NO. : 5,481,089
DATED : January 2, 1996
INVENTOR(S) : Hideki Furuta

It is certified that error appears in the above-indentified patent and that said Letters Patent is hereby corrected as shown below:

In the Abstract, front page, last line, delete "respect to voltage".

Claim 2, column 14, line 33, delete "detected by said temperature".

Signed and Sealed this

Twentieth Day of August, 1996

*Attest:*

BRUCE LEHMAN

*Attesting Officer*  *Commissioner of Patents and Trademarks*